United States Patent [19]  [11] 4,399,654
David  [45] Aug. 23, 1983

[54] POWER PLANT HAVING A FREE PISTON COMBUSTION MEMBER

[76] Inventor: Constant V. David, 4952 Field St., San Diego, Calif. 92110

[21] Appl. No.: 350,326

[22] Filed: Feb. 19, 1982

[51] Int. Cl.³ .............................................. F02B 71/04
[52] U.S. Cl. ..................................... 60/595; 123/228; 123/229; 123/231; 123/46 A; 418/186; 418/251
[58] Field of Search ............. 123/204, 228, 229, 231, 123/46 R, 46 A; 60/39.6, 39.62, 39.63, 39.78, 595, 596; 418/186, 187

[56] References Cited

U.S. PATENT DOCUMENTS

| | | | |
|---|---|---|---|
| 1,101,688 | 6/1914 | Diamant | 123/229 |
| 1,620,565 | 3/1927 | McKeown | 123/46 A |
| 1,858,102 | 5/1932 | McKeown | 123/46 A |
| 2,595,396 | 5/1952 | Lee | 60/595 X |
| 3,040,530 | 6/1962 | Yalnizyan | 123/228 |
| 3,057,157 | 10/1962 | Close | 123/204 X |
| 3,422,801 | 1/1969 | Mido | 123/229 |
| 4,245,597 | 1/1981 | Thill | 123/204 |

FOREIGN PATENT DOCUMENTS

| | | | |
|---|---|---|---|
| 2818278 | 11/1979 | Fed. Rep. of Germany | 123/204 |
| 280283 | 11/1927 | United Kingdom | 60/39.78 |

Primary Examiner—Michael Koczo
Attorney, Agent, or Firm—Brown & Martin

[57] ABSTRACT

A power plant including a vane type engine having fuel compression means and a gas expansion means. Air or an air-fuel mixture compressed by the vanes in the compression means is fed to a free piston combustion member where burning takes place and gases are returned to the gas expansion means of the engine to drive the power shaft.

16 Claims, 23 Drawing Figures

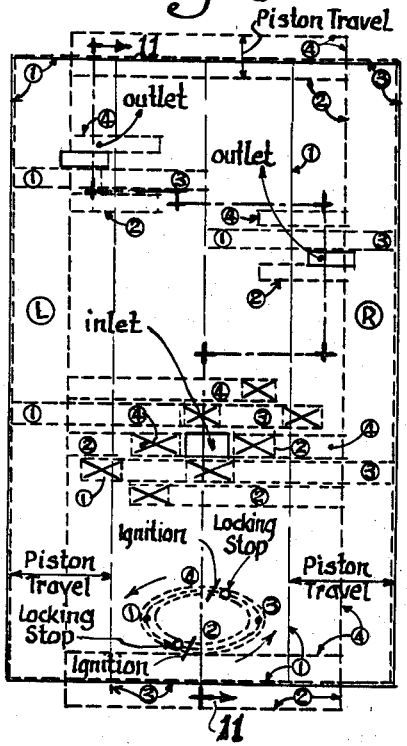
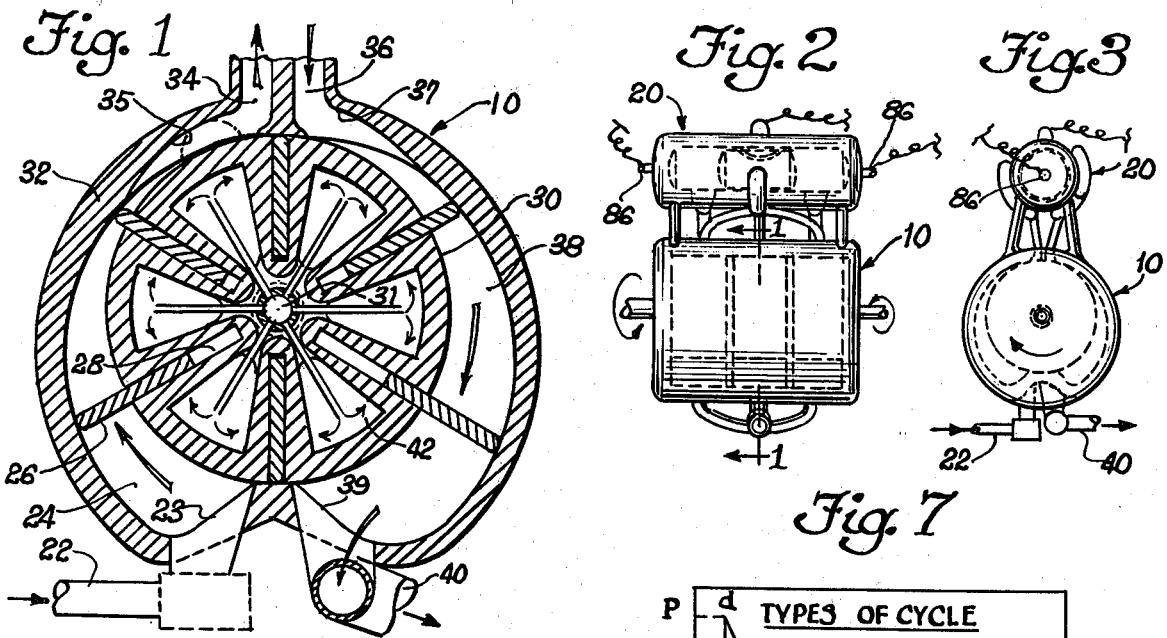
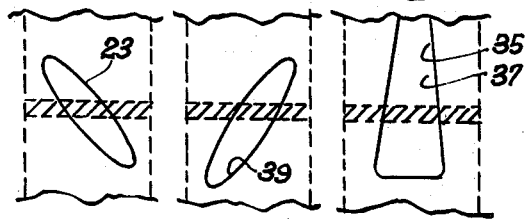
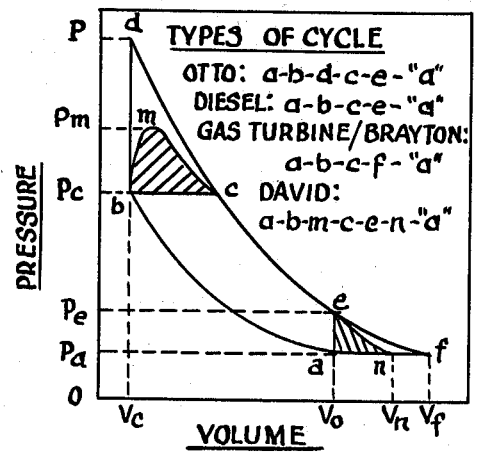
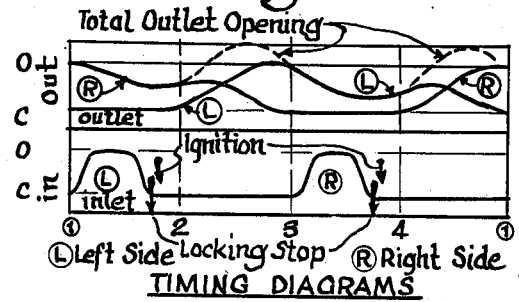
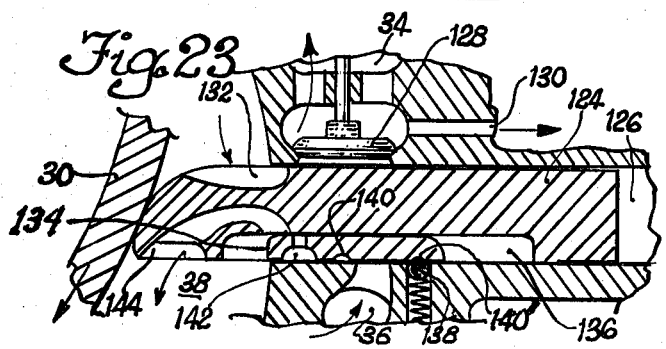

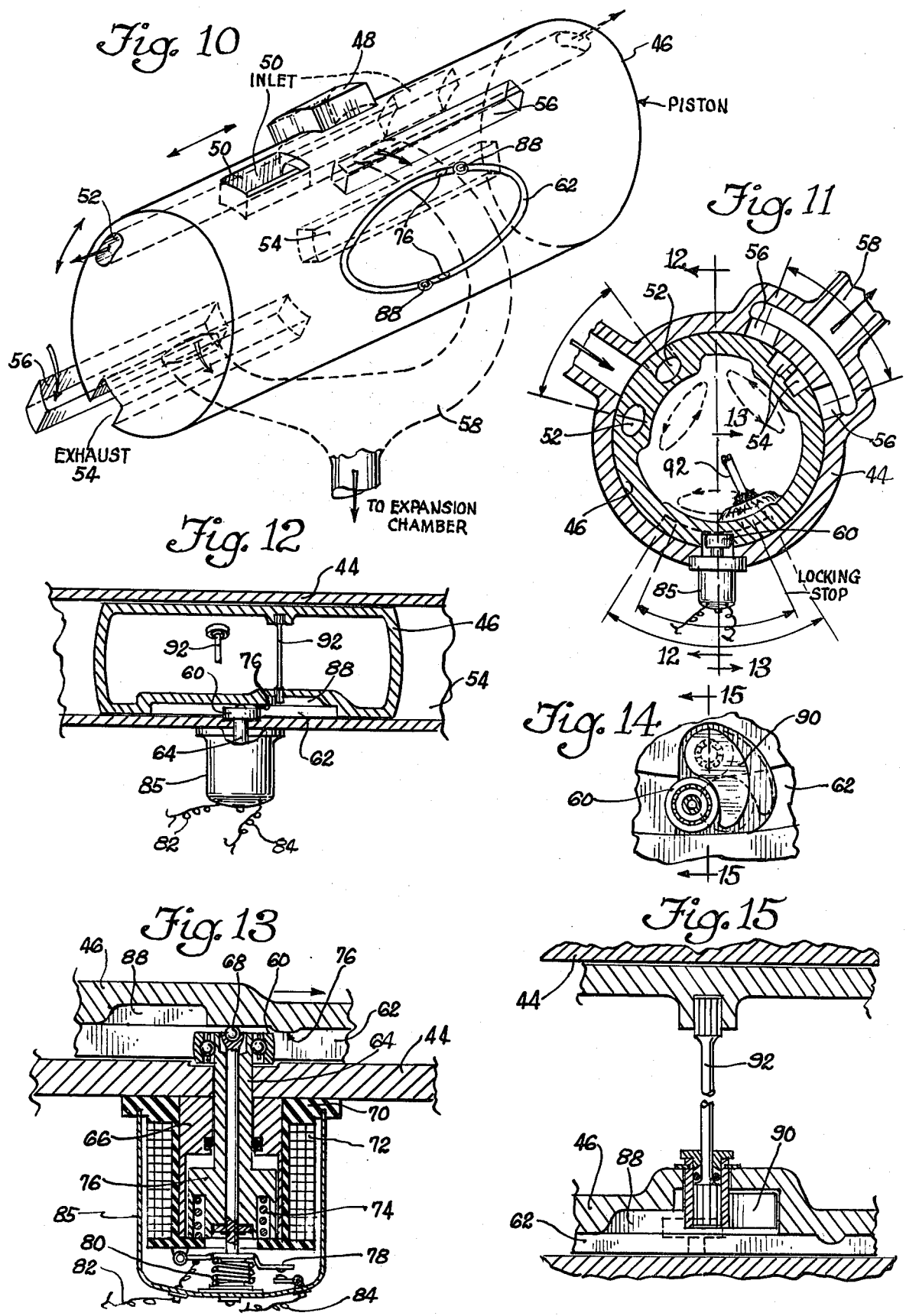

POWER PLANT HAVING A FREE PISTON COMBUSTION MEMBER

BACKGROUND OF THE INVENTION

The present invention relates to a power plant that combines the advantages of different types of power plants into a single construction.

Conventional engines or power plants present significant cooling problems. Further, each type of engine, such as Otto Cycle, turbine and Diesel is limited in its design possibilities by its principle of operation. Particular fuels must be used for example.

Diesel and Otto Cycle engines produce undesirable vibrations and low frequency noise. Diesel engines require high compression ratios and are difficult to start. The typical engine requires a large number of complex moving parts. Gasoline type internal combustion engines require highly volatile fuels. Turbine engines produce high frequency noise and require expensive and complicated fuel control mechanisms.

Efforts are continuously being made to develop a new engine or power plant that is more efficient and less expensive to produce and operate. Recent efforts with rotary engines and Stirling Cycle Engines are evidence of this continuing effort.

In view of this background, it is an object of the present invention to provide a new and improved power plant that combines features of different types of engines to produce an effective power plant that will work with various types of fuels.

It is another object of the present invention to produce a new and improved power plant that is simple in construction with few moving parts that lends itself to production techniques at relatively low cost.

It is another object of the present invention to provide a new and improved power plant that runs smoothly in operation, and that has a low noise factor.

It is another object of the present invention to provide a new and improved power plant that permits flexibility in design to accomplish varying objectives of power and efficiency.

It is another object of the present invention to provide a new and improved power plant that has low friction losses and that is efficiently cooled.

It is another object of the present invention to provide a new and improved power plant wherein valving is simple and wherein timing is not as critical as is the case with conventional piston engines.

It is another object of the present invention to provide a new and improved power plant wherein a heat exchanger can be simply incorporated to increase efficiency.

It is another object of the present invention to provide a new and improved power plant wherein the engine member and the combustion member are mechanically segregated to allow the use of most optimum materials for the construction of each of these two members.

It is another object of the present invention to provide a new and improved power plant wherein the piston linear motion and the engine shaft circular motion are not connected to minimize volume, weight, wear and power losses.

It is another object of the present invention to provide a new and improved power plant wherein the overall reliability is enhanced, the maintenance made earier and repair work less expensive.

It is another object of the present invention to provide a new and improved power plant wherein the vibrations transmitted to the engine mountings and power shaft are minimized.

SUMMARY OF THE INVENTION

The above objects are retained by a power plant utilizing an engine including compression means in communication with separate combustion means whereby fuel is compressed and burned. The gases of combustion are passed from the combustion means into expansion means in the engine to provide the driving power.

DESCRIPTION OF THE DRAWINGS

FIG. 1 is a midsectional elevation of the engine section of the power plant of the present invention.

FIG. 2 is a side elevation of the complete power plant of the present invention.

FIG. 3 is an end view of the power plane shown in FIG. 2.

FIG. 4 is an enlarged view of an inlet port to the compression chamber of the engine section shown in FIG. 1.

FIG. 5 is an enlarged view of the outlet port from the expansion chamber of the engine section shown in FIG. 1.

FIG. 6 is an enlarged view of the compression chamber outlet and the expansion chamber inlet ports of engine section shown in FIG. 1.

FIG. 7 is a pressure-volume chart showing a comparison of the performance of the Otto cycle engine, the diesel engine, the gas turbine or Brayton engine, and the present invention identified as the "David engine".

FIG. 8 illustrates the manner in which the inlet and outlet ports of the piston and sleeve of the combustion member cooperate during axial and rotational movement of the piston to provide valving.

FIG. 9 is a timing diagram pertaining to the opening and closing sequences of ports in the combustion member as a result of axial sliding and rotation of the piston within the sleeve.

FIG. 10 is a perspective view of the piston of the combustion member of the present invention with only the ducts of the sleeve which surrounds the piston shown for simplicity.

FIG. 11 is a section taken along the line 11—11 of FIG. 8.

FIG. 12 is a partial simplified longitudinal sectional view of the sleeve and piston of the combustion member of the present invention.

FIG. 13 is an enlarged sectional view showing the stopping means for stopping the piston in a preselected position relative to the sleeve in the combustion member of the present invention, and the guiding means of the piston within the sleeve.

FIG. 14 is an enlarged detail view of a portion of the mechanism for stopping the piston in a combustion member in a preselected position.

FIG. 15 is an enlarged sectional view of a portion of the stopping mechanism shown in FIGS. 12—14.

FIG. 23 is an enlarged section of the valving mechanisms shown in the upper left portion of FIG. 19.

DETAILED DESCRIPTION OF THE INVENTION

Figure 16:
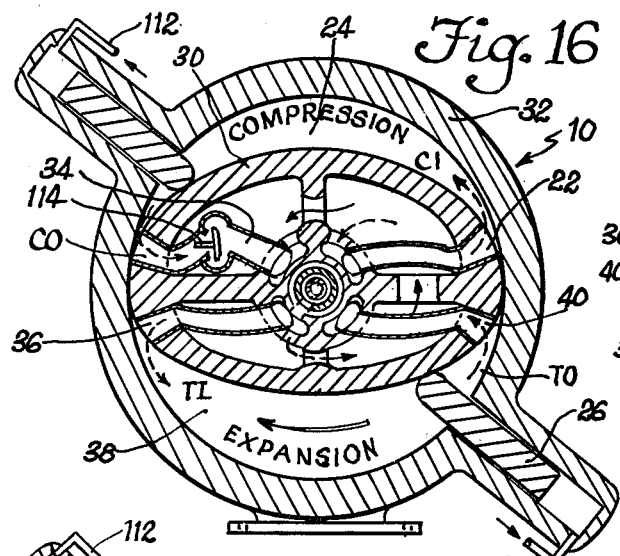
FIG. 16 is a front sectional elevation of a second embodiment of the engine portion of the power plant of the power plant of the present invention.

Referring to FIGS. 2 and 3 of the drawings, the power plant of the present invention generally comprises an engine 10 coupled to a combustion member 20. The engine compresses the air or fuel-air mixture in a compression chamber and passes it to the combustion member. The combustion member ignites the combustible material and passes the expanded gases back to the expansion chamber of the engine 10. If the fuel injection is involved, the compression chamber compresses air, and the fuel is supplied by injectors to the combustion member. The components are constructed so that more than one engine section can be used with one combustion member and more than one combustion member can be used with one engine.

This type of power plant can use different types of fuels. It is ideal for methanol fuels which run cooler with less corroding pollutants and soot. Separation of the engine side and combustion side of the power plant makes it extremely adaptable for incorporation of heat exchangers to boost the efficiency, cool the system, and reduce friction problems. There is no mechanical connection or timing connection between the engine operation and the combustion operation which are completely separated chronologically.

The power plant of the present invention lends itself to flexibility in design because the ratio between the compression volume and the expansion volume in the engine chambers can be adjusted to the desired ratio for the particular objective.

The engine 10 is shown in detail in FIG. 1 of the drawings. It includes an inlet 22 and port 23 through which a fuel-air mixture or air (with fuel injection) is passed into a compression chamber 24. This will be referred to as the "compression fluid" hereinafter in describing the operation. The compression fluid is compressed in a chamber 24 by means of the vanes 26 which are slidably disposed in channels 28 in rotor 30 that is mounted on a central rotating shaft 31. The compressed compression fluid is moved out of the compression chamber 24 by the vanes, which sweep the contour of the compression chamber in the housing 32, into the outlet passage 34 through port 35. The compression fluid is burned in the combustion member 20 as explained hereafter and the gases of combustion travel back through return passage 36 and port 37 into the expansion chamber 38 of the engine 10 which is larger than the compression chamber 24. The gases apply pressure against the vanes 26, causing rotation of the vanes and central shaft, and flow out the exhaust port 39 and passage 40. The rotor is cooled by internal air passages 42 into which air is circulated from the central shaft 31 which is hollow. The ports 23, 35, 37 and 39 are designed to permit the rotary vanes to pass over them without losing stability while providing maximum fluid flow therethrough.

When the compression fluid flows through the passage 34, it travels to the combustion member 20 shown in detail in FIGS. 10–15 of the drawings. The combustion member includes an outer sleeve 44 in which a free piston 46 is positioned for travel in a combined sliding and rotating path determined by an elliptical track in the piston wall. Because the combustion member consists of two combustion chambers and a free piston moving in between, the combustion member is also referred to as a "dynamic combustion chamber".

The compression fluid from passage 34 of the engine 20 is conducted to an inlet port 48 in the sleeve 44 and from there alternately through inlet ports 50 in the piston and internal passages 52 in the piston to the interior 54 of the sleeve, first at one end of piston 46 and then at the other end. Exhaust passages 54 in the piston 46 periodically mate with exhaust ports 56 in the sleeve 44 to exhaust gases through the outlet 58 and passage 36 in engine 10 to the expansion chamber 38 in the engine where they drive the vanes 26.

The timed registering of the intake and exhaust ports in the piston with the inlet and exhaust ports of the sleeve is accomplished with a roller type follower or guide 60 that extends from sleeve 44 into an oval or elliptical shaped track 62 in the piston 46. Thus, as the piston reciprocates in the sleeve, it also rotates to time the registering of the proper inlet and exhaust ports in the sleeve and piston. The follower 60 is rotatably positioned on shaft 64. The shaft 64 is slidably positioned within enclosure 66 and includes a ball 68 on the end thereof.

FIG. 8 illustrates the relative positions of the ports in the sleeve 44 and piston 46 as the free piston slides axially and rotates within the sleeve. The piston defines two combustion chambers within the sleeve, one at each end of the sleeve. FIG. 9 illustrates how the timing of the opening and closing of the various ports in the piston and sleeve accomplishes the desired valving. In this diagram, the letter "C" indicates closed and the letter "O" indicates open. The letter "L" refers to the left hand combustion chamber in the sleeve and the letter "R" refers to the right hand combustion chamber in the sleeve. The inlet port degrees of opening or closing are illustrated in FIG. 9 by the lines or curves which are labelled "inlet". The outlet port degrees of opening or closing are illustrated in FIG. 9 by the curves or lines referred to as "outlet". The broken lines entitled "Total Outlet Opening" indicate the timing and degree of the total outlet port openings for both combustion chambers in the sleeve that vent into the exhaust duct 58 (FIG. 11) that connects to the engine expansion chamber inlet. The free piston positions with respect to the sleeve are referred to as one, two, three, four and finally one, to complete the cycle.

Referring to FIG. 8, the free piston surface is indicated in broken lines in four typical positions, namely one, two, three and four referenced in the timing diagram of FIG. 9. The surfaces of the sleeve are illustrated in solid lines in FIG. 8. As the free piston is guided in its travel by the elliptical track illustrated in the lower part of FIG. 8, the port openings of the free piston end of the combustion chamber sleeve assumes the relative positions illustrated for the four typical free piston positions, namely full left (1); middle lower position (2); full right (3); and middle upper position (4). The positions of the free piston at which either locking or ignition take place are also illustrated in the diagram of FIG. 9 for reference. By following the relative motion of the free piston from one position toward the next, and checking against the diagram of FIG. 8, it will be understood how and when the gases enter and leave the combustion chambers in the combustion member in the correct predetermined sequence.

A spool 70 of insulating material such as a suitable plastic is located over the enclosure 66 and has a wire coil 72 wound thereon forming a solenoid with shaft 64. A spring 74 is seated between a shoulder 76 formed on the shaft 64 and one end of spool 70. This spring normally tends to force the shaft 64 in toward the piston 46 to engage the ball 68 with a portion of track 62. A pair of bosses 76 extend into the track 62 to create two ignition points during the travel of the follower 60 in the track 62. When ball 68 rides over one of the bosses 76, the shaft 64 moves downward and contacts the pivotal arm 78 of the ignition contact points. This depresses the pivotal arm against the force of spring 80 and creates ignition through a suitable source of energy (not shown) connected to the wires 82 and 84. The contact points and solenoid are contained within housing 85. Spark plugs 86 (FIG. 2) are positioned at each end of sleeve 44 and are connected to the ignition source (not shown). When fuel injection is used, fuel injectors are also positioned in that location.

A mechanism is provided for stopping the piston 46 in the desired position when the power plant is de-energized. When the ignition key (not shown) is turned on, the coil 72 moves the shaft 64 in a direction away from the piston 46 and the follower 60 travels in a position shown in FIG. 13 of the drawings. However, when the ignition key is turned off, the coil 72 is de-energized and the spring 74 takes over to force the shaft 64 toward piston 46. In this condition, the spring 74 will move the follower 60 into one of two pockets 88 when the follower is aligned with the pocket. The follower 60 moves against a pivotal finger 90 extending into the pocket 88 from piston 46. The finger 90 is mounted on a torsion member 92 which is fixed in piston 46. There are two such fingers and torsion members in the piston. Thus, when the power plant is shut down, the follower 60 moves against one of the fingers 90 and the shock is absorbed in the accompanying torsion member 92. The piston is thus stopped in the desired position. When the ignition key is turned on again, the coil 72 moves the follower 60 out of the pocket 88 so that the piston is free to move once again.

OPERATION

To start the power plant, the starter 110 (FIG. 22) is energized so that compressed air can accumulate in either of the two combustion chambers, depending upon the locking stop in which the free piston is held. From the diagram of FIG. 8, it can be seen that for the locking position, only one inlet to a combustion chamber within the sleeve can be open. The other combustion chamber within the sleeve is vented to the engine expansion chamber. The engine, driven by starter 110, compresses air or fuel-air mixture in one combustion chamber within the sleeve, while the free piston 46 is still locked and held in place. Piston 46 is held in place until the piston guide actuator is energized, at which time, the ignition is turned on and fuel is injected. Piston 46 then starts moving. Then the roller 68 contacts the first boss 76, the ignition occurs and the normal operation cycle has started. As in the case of a gas turbine starting cycle, the starter can be kept energized to assist the power plant to reach its idling speed, at which time it can be shut off.

When the ignition key is turned on, the follower 60 moves out of the pocket 88 in the piston and the piston 46 is free to move in the combustion member 44. Generator 111 generates electrical power in the usual fashion. Compressed air flows out of the engine 10 through passage 34 (FIG. 1) to the sleeve inlet port 48. When the piston 46 is in the stopped position, one of the inlet ports of the piston is aligned with the inlet port of the sleeve, and one outlet port of the piston sleeve is aligned with one outlet port of the sleeve. Thus, compressed air enters into one end of the sleeve and the piston is moved. Fuel is injected into the combustion chamber by conventional injectors (not shown). The ignition point contacts are closed when the roller 68 contacts the first boss 76. At this point in the cycle, the inlet ports of the piston and sleeve are out of register and the outlet ports in the piston and sleeve leading to the other end of the sleeve are in register. Ignition occurs and the piston 46 is driven toward one end of the sleeve in the combined sliding-rotary movement dictated by the track 62 in the piston. When the piston nears the end of its travel, the outlet port closes and some gases are trapped into and inside a closed volume. The kinetic energy of the piston dissipates itself into compressing these trapped gases, which elastically store the kinetic energy of the piston as would a spring. These compressed residual gases then provide the force that pushes the piston back toward the other combustion chamber within the sleeve. For instance, if the starting position of the piston was the upper locking stop position (reference position 3 in FIGS. 8 and 9), then when the ignition is turned on and the piston is unlocked, the piston travels through point 4 in FIG. 8. The outlet port 4 of the piston (illustrated in broken lines in FIG. 8) passes over the outlet port of the sleeve and lets the gases flow into the outlet duct and into the engine expansion chamber. Then, as the piston continues its motion toward the left, it also rotates and gradually closes the outlet port on the left side.

As the piston moves left, it is also forced to rotate in the downward direction and both outlet ports in the piston and sleeve move out of registration shortly before reference point 1 (FIGS. 8 and 9) is reached. During that time, the outlet of the other combustion chamber in the sleeve was closed because their corresponding ports were out of registry. This allowed the burned gases in the right combustion chamber within the sleeve to expand and assist the scavenging of the left combustion chamber in the sleeve. As the piston passes over reference point 1 and starts moving to the right, the outlet opening of the left combustion chamber within the sleeve remains closed all the way until the piston goes through reference points 2 and 3. The outlet ports of the upper left corner of the diagram of FIG. 8 are out of registry all of this time. However, as soon as the piston has bounced back toward reference point 2, the inlet ports of the piston and of the sleeve come into registry. The piston inlet ports shown in broken lines and marked with diagonal lines in FIG. 8 moves downward. Compressed air is admitted in the left combustion chamber within the sleeve. In the event that fuel is injected directly into the sleeve, this occurs as the piston passes over the lower locking stop. The burning fuel-air mixture generates the rise in pressure that then drives the piston past reference point 2 toward the right side of the sleeve. The combusted gases within the right side of the sleeve can be scavenged and expulsed into the outlet, illustrated in the upper right side of the diagram of FIG. 8, and into the engine expansion chamber.

As the piston moves from reference point 2 to reference point 3, the piston outlet port must move to cover the outlet port of the right side combustion chamber in the sleeve which is shown in the upper part of the right side of FIG. 8. The process described above is then repeated after the piston reaches and passes over the reference point 3. The piston bounces back from reference point 3 because of the energy stored in the trapped gases in the right side combustion chamber within the sleeve. When the engine has reached idling speed, the starter assistance is cut-off. The power level is then adjusted by metering the amount of fuel injected for each cycle of either combustion chamber, as is done with fuel injection in Diesel engines.

Referring now to FIG. 10 to illustrate how the ports of the free piston and of the combustion member sleeve relate physically, a similar sequence of events is described hereafter. Again, starting from the unlocking of the free piston, the following takes place.

The other inlet ports and outlet ports in the sleeve 44 and piston 46 are then aligned in proper sequence and ignition occurs in a like manner in the combustion chamber at the other end of the sleeve as the roller 68 contacts the other boss 76.

The exhaust gases from the sleeve 44 are passed through passage 58 (FIG. 10) to the expansion chamber 38 of engine 10 (FIG. 1) where they expand and impart energy to the vanes 26 which rotate the shaft 31.

The cycling of the inlet ports and outlet ports of the sleeve and piston in and out of register is determined by the track 62 in piston 46 riding on the follower 60 extending from sleeve 44. Assume that the piston 46 has finished a stroke and it is adjacent the left end of the sleeve 44. At this point, the follower 60 is at one end of the track 62 in piston 46. As the piston moves to the right, it commences to rotate because of the shape of the track. One piston inlet port 50 gradually moves into registry with the sleeve inlet port 48, and compressed air from the engine 10 flows through the ports and through piston passage 52 into the combustion chamber at this left end of the sleeve 44. Fuel is injected into this chamber. As the piston 46 moves to the right in the sleeve 44, one piston exhaust passage 54 commences to align or register with one sleeve exhaust port 56 and the exhausted gases pass to the expansion chamber 38 in engine 10 as previously described.

The inlet ports are out of registry, and the exhaust passages are aligned for ignition. The piston 46 reaches the end of its travel to the right where it bounces back to the left due to the cushion of residual gases. The other piston inlet passage 52 now moves to register with the sleeve inlet port 48. The other inlet port of the piston is out of registry, with the sleeve inlet port 48 when ignition takes place at the right end of the sleeve, with the exhaust ports partly in register. The exhaust ports of the sleeve and piston gradually align and the piston 46 completes its travel to the left end of the sleeve 44 moving the gases into the exhaust passage 58 (FIG. 10).

To stop the power plant, both the ignition and/or fuel injection are shut off. No driving power is then generated and the engine slows down. At this point further slowing down can be achieved by opening a "dump valve" 152 (FIG. 21) between the combustion member outlet and the expansion chamber inlet interconnected by ducts 150. At which time, the solenoid that actuates follower 60 is then de-energized, which allows follower 60 to fall freely into pocket 88 to stop piston 46 of the combustion member. The de-energizing of this solenoid is sequenced to occur immediately after an ignition signal has been detected, to insure that the piston bounces back on its return cycle and locks. The proper sequencing (not shown) between these steps insures that the piston bounces back at low velocity in order to minimize the amount of kinetic energy that the torsion member 92 must absorb.

The results of this power plant are shown in the pressure-volume diagram of FIG. 7 of the drawings. The operation of this power plant is referred to as the "David cycle". It will be noted that the David cycle power plant has a gain in expansion volume over the Otto and Diesel cycles and a loss in peak pressure volume with respect to the Otto cycle. The David cycle produces a gain in peak pressure over the Diesel and turbine cycles. The overall performance compares favorably with the other engine types.

Figure 17:
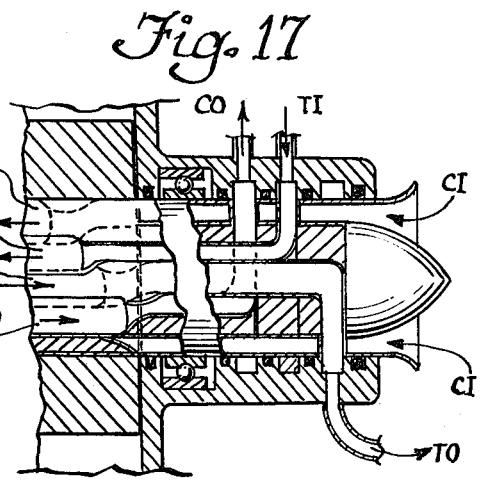
FIG. 17 is a side sectional elevation of the front end of the engine illustrated in FIG. 16.

FIGS. 16 and 17 of the drawings illustrate an embodiment of the present invention wherein the vanes 26 are located in the engine housing 32 rather than in the rotor 30. The vanes 26 are held in contact with the rotor 30 by means such as the compressed air passages 112. The compression chamber 24 is located at the top of the engine 10 and the expansion chamber 38 is shown at the bottom of the engine. Again, the expansion chamber is larger in volume than the compression chamber. In this modification, compression fluid is introduced into the compression chamber 24 through inlet passage 22. The compression chamber outlet passage 34 includes a check valve 114. The expansion chamber 38 includes an inlet passage 36 and an outlet passage 40. The passages extend from the hub of the rotor 30 to the periphery of the rotor rather than being positioned externally as shown in FIG. 1.

On both FIGS. 16 and 17, for ease of identification, the compressor inlet is referred to as CI, the compressor outlet as CO, the engine expansion chamber inlet as TI and the engine expansion chamber outlet as TO. Therefore, the end of the ducts identified as CI, CO, TI and TO connect through the engine shaft openings of FIG. 17 to the rotor ducts, the ends of which are also correspondingly identified by CI, CO, TI and TO in FIG. 16. The same identification mode is also used in FIGS. 19 and 20. FIG. 17 shows how the compressor inlet is ducted around the engine shaft bullet nose into the engine rotor. The expansion chamber inlet and outlet ducts are connected from the engine rotor through slip rotating sealed annular grooves in the housing support of the front end rotor shaft. These annular grooves are the connecting elements between the external ducts CO, TI and TO on one hand and the engine rotor ducts CO, TI and TO on the other and identified on the left side of FIG. 17. These annular grooves act as gas collectors between the rotating shaft the fixed housing.

Figure 18:
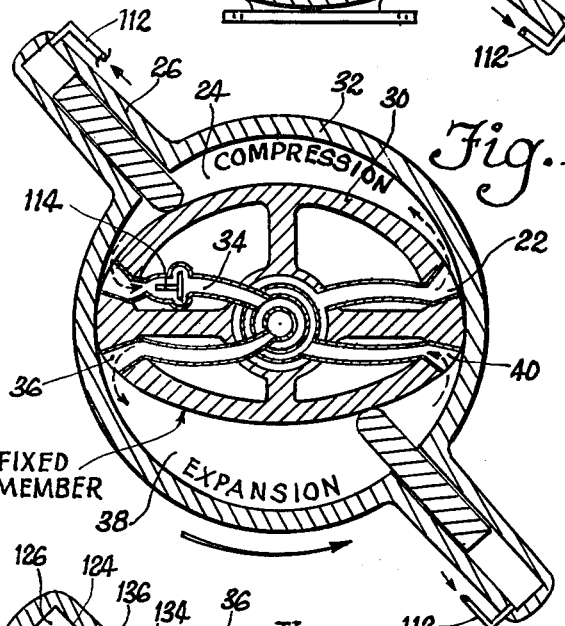
FIG. 18 is a front sectional elevation of a third embodiment of the engine section of the power plant of the present invention.
Figure 21:
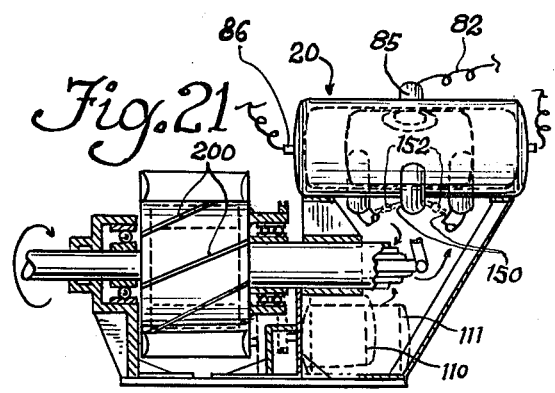
FIG. 21 is a side elevation, partly in section, of the power plant of the present invention as shown in FIG. 18.
Figure 22:
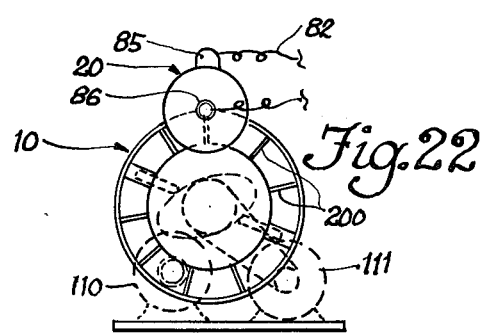
FIG. 22 is a right end elevation of the power plant shown in FIG. 21.

The modification shown in FIG. 18 of the drawings utilizes a fixed stator 30 and a rotatable housing 32. As in the modification of FIG. 16, the vanes 26 are positioned in the housing 32 and the passages are within the member. FIGS. 21 and 22 of the drawings demonstrate the use of cooling vanes 200 to assist in cooling the power plant shown in FIG. 18 of the drawings.

Figure 19:
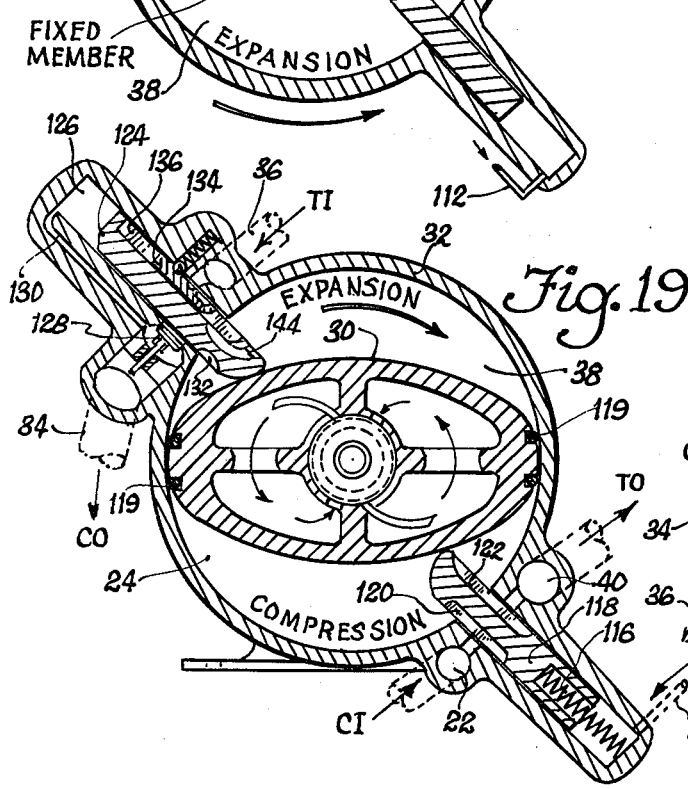
FIG. 19 is a front sectional elevation of a fourth embodiment of the engine section of the power plant of the present invention.

The modification shown in FIGS. 19 and 23 discloses a construction wherein the member 30 is rotatable and has seals 119 on its periphery. In this modification, one of the vanes 118 extends against a spring 116 which presses the vane against the rotor 30. A compressed air inlet 112 supplements the spring pressure. The inlet passage 22 to the compression chamber is positioned adjacent to a recessed portion 120 in the vane, which passes the compression fluid to the compression chamber when it is in register with the inlet 22. A recessed portion 122 exhausts gas from the expansion chamber 38 when it is in register with the passage 40.

A vane 124 is disposed in a chamber 126 in housing 32. The compression chamber outlet 34 communicates with a check valve 128 in the housing. The compression fluid which was introduced through inlet 22, is compressed by the lobe of rotor 30 and moved through opening 132 and valve 128 out the passage 34 as vane 124 is moved into chamber 126 by rotor 30. The check valve prevents reverse flow. A passage 130 extends between the chamber for valve 128 and the outer end of vane chamber 126. The pressure due to the compression fluid exerts a force on the outer end of vane 124 tending to move it radially inward.

A shuttle 134 is slidably disposed in a track 136 in the vane 124. The pressure in the outer end of vane chamber 126 forces the vane radially inward and when the lobe of rotor 30 moves toward a position that is perpendicular to the vane 124, the vane thus moves inward and contacts the outer end of shuttle 134 moving it to the position shown in the drawings where spring loaded ball 138 is seated in detents 140 or 140' in shuttle 134 (FIG. 23). In this position, gases in the expansion chamber inlet 36 are prevented from flowing to the expansion chamber 38.

When the lobe of rotor 30 approaches alignment with the end of vane 124, the vane is moved radially outward into vane chamber 126. The inner end of the shuttle chamber 136 moves against the shuttle 134 and slides it radially outward until the ball 138 seats in detent 140 in shuttle 134 (FIG. 23). In this position, opening 142 in shuttle 134 aligns with the expansion chamber inlet 36, and passage 144 in vane 124 communicates with opening 142 and with the expansion chamber 38. Thus, gases are introduced into the expansion chamber. This arrangement gives the gases in the expansion chamber the possibility to expand. The shuttle-valve 134 and vane 124 geometries and the relative dimensions of track 136 in vane 123 determine the portion of the expansion cycle which is used for gas admission. The end result is a predetermined gas expansion ratio of the expansion chamber.

Figure 20:
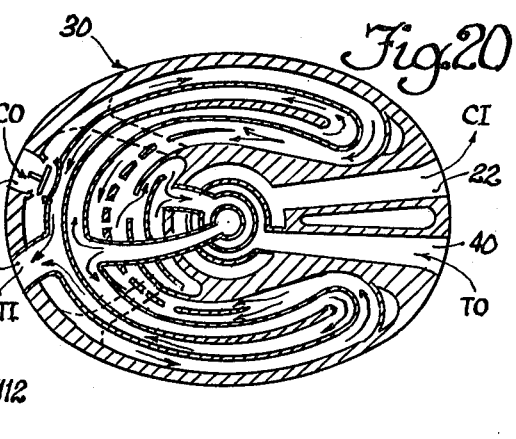
FIG. 20 is a sectional elevation of a heat exchanger element usable with the embodiments shown in FIGS. 16 and 18.

FIG. 20 shows a modification wherein the compressor chamber inlet 22, compressor chamber outlet 34, expansion chamber inlet 36 and expansion chamber outlet 40 communicate with central annular openings, similar to the modification shown in FIGS. 16-18 of the drawings. The passages to the central openings are routed in a circuitous path so that the member 30 also serves as an effective heat exchanger, through which heat is transferred from the dynamic combustion chamber outlet gases to the compressed air before it enters the dynamic combustion chamber. This results in lower expansion chamber inlet temperatures and higher dynamic combustion chamber inlet temperatures. The overall effect is an increase in power plant efficiency and cooler engine running.

Although a vane-type of engine is used in the above description, the dynamic combustion chamber described herein could also be used with any other type of engine that incorporates both a compression means and an expansion means such as a piston engine or a gas turbine for example. The dynamic combustion chamber could then be simply incorporated between the compression and the expansion means since no mechanical connection is needed between said dynamic combustion chamber and either the compression or the expansion means, only ducting. The valving function is also provided by the dynamic combustion chamber which makes it a very adaptable hot gas generator. Furthermore, a portion of the gas coming from the compression member outlet can be bypassed through ducts 150 (FIG. 21) directly to the expansion chamber inlet to mix with the dynamic combustion chamber outlet hot gases so that the dynamic combustion chamber can operate at higher temperatures while the expansion member operates at lower temperatures. In addition, the ratio between the amount of gases that bypasses the dynamic combustion chamber and the amount of gases that are admitted in the dynamic combustion chamber can be made variable and adjustable with conventional valves 152 (FIG. 21) that can then be used to adjust or control the power level of the power plant. Also, high pressure gases can be ducted either from the outlet of the compression chamber or the outlet of the dynamic combustion chamber to be used elsewhere, thereby making the power plant operate as a gas generator as required. In case the engine was intended to run only on clean air (not burned gases), instead of mixing gases as mentioned above, one can use the hot gases coming out of the dynamic combustion chamber to heat up the bypassed compressed air in a heat exchanger. The engine can then operate according to a Stirling or Ericsson cycle. The overall efficiency would be lower, but the engine life would be considerably increased.

The power plant of the present invention can accommodate various fuels and methods of fuel supply. Fuel injection can be readily used, and can be used in combination with glow plugs or high energy spark plugs and glow plugs. For fuel injection applications, the compressor compresses and supplies air rather than air-fuel mixtures.

In most configurations of the power plant described above, fuel injection appears the most advantageous way to add the fuel to the hot compressed air. In the mode of operation in which the dynamic combustion chamber is kept very hot (compressed air by-pass), except for start-up, a high energy or glow plug would not be required for normal running.

The use of graphite/carbon or graphite/graphite 3-D reinforced materials for both rotor and stator reduce cooling and/or lubrication requirements and provide thermal expansion accommodation. Because of the small coefficient of thermal expansion, high heat capacity and good thermal conductivity of these materials, sealing problems are thereby minimized. Strength increases with temperature up to a point. The use of graphite/carbon matrices and graphite/carbon reinforcing fibers for the engine rotor and casing could allow sweat cooling and/or lubrication. With the use of such materials, the dynamic combustion chamber could also operate at temperatures much higher than those possible with steel alloy components. Because of the absence of mechanical connections between the dynamic combustion chamber and the engine, except for gas ducts and mounting supports, the materials used for each member can be of quite different nature, i.e.: Carbon/Graphite for the dynamic combustion chamber and conventional metals for the engine, should this provide the most ideal type of construction.

Although the power plant of the present invention is driven in the manner of a gas turbine, the amount of total gas processed and ejected per unit of power is still much lower than that of a gas turbine so there is no high pitched whine at the exhaust. The vibration and low frequency noise is less than produced by a gasoline engine or Diesel engine for the same power output. It should be emphasized that the gas pressures do not exert forces on sliding components such as in the case of the piston/connecting rod/crankshaft arrangement of piston engines. This minimizes the lubrication, sealing and wear problems.

The gas mixture burns at a quasi-constant volume such like in an Otto Cycle Engine. There is continuous exhaust from the combustion chamber at constant high pressure. A given amount of hot gases is admitted into the expansion chamber and expanded to exhaust at a pressure close to atmospheric pressure.

It will be noted that there is a minimum number of moving parts and that they are not connected to the power shaft directly. Admission, exhaust and ignition functions relate simply and directly to maximize efficiency and reliability, and to minimize cost.

Having thus described my invention, I claim:

1. A power plant comprising:
   means for supplying compressed air;
   a combustion member including a sleeve with axially spaced inlet means and outlet means and igniting means at each end of the sleeve, a free piston mounted in the sleeve for axial sliding movement and including spaced inlet and outlet means;
   means for introducing fuel to form a fuel-air mixture for burning in the combustion member to produce combusted gas;
   means for imparting rotational movement to the piston as it slides axially so that the inlet and outlet means in the piston are registered with the inlet and outlet means in the sleeve in proper timed sequence to provide intake and exhaust valving functions; and
   means for receiving and expanding the combusted gas to drive a power delivery member.

2. A power plant according to claim 1 wherein the external surface of the piston includes an elliptical shaped track and the sleeve includes a follower positioned in the track whereby rotary motion is imparted to the piston as it reciprocates and the track rides on the follower.

3. A power plant according to claim 2 wherein the track includes two spaced apart bosses and the follower is normally urged against the track and is moved outward when it engages one of the bosses; and
   ignition contact means is disposed adjacent the end of the follower that is remote from the piston for connection to an energy source to create ignition when the contact means is closed by one of the bosses.

4. A power plant according to claim 3 wherein stop means is provided for stopping the piston in the sleeve in a predetermined position, the stop means including:
   a pocket in the piston; and
   means for urging the follower into the pocket when the ignition is de-energized and moving it away from the pocket when the ignition is energized.

5. A power plant according to claim 4 wherein the pocket includes shock absorbing means for absorbing the impact of the piston against the follower when the piston stops.

6. A power plant according to claim 5 wherein the shock absorbing means includes finger means on the piston in the pocket for engaging the follower in the stop position and torsion bar means in the piston connected to the finger means.

7. A power plant according to claim 1 including adjustable bypass means for bypassing a portion of the compressed air from the supply means directly to the expansion means to mix with combusted gas from the combustion member, thereby permitting the combustion member to operate at higher temperature than the expansion means and controlling the power level of the power plant.

8. A power plant according to claim 1 wherein the supplying means and expansion means comprises:
   a housing with a compression chamber and an expansion chamber therein;
   an inlet to the compression chamber for intake of air and an outlet from the compression chamber for passing compressed air into the combustion member;
   an inlet to the expansion chamber for accepting combusted gas from the combustion member, and an exhaust from the expansion chamber for exhausting the combusted gas;
   a central member positioned within the housing, one of the housing and central member being rotatable relative to the other and connected to a power output shaft; and
   radially slidable vane means extending between the central member and the housing for sealing the compression chamber and expansion chamber as required during rotation to permit air inlet into the compression chamber, compressed air outlet from the compression chamber to the combustion member, introduction of combusted gas into the expansion chamber from the combustion member, and exhaust of combusted gas from the engine.

9. A power plant according to claim 8 wherein the vane means includes vanes that are slidably disposed in the central member which is connected to the power output shaft and which is rotatable relative to the housing;
   means are provided in the central member for urging the vanes radially outwardly against the walls of said chambers; and
   the inlet and outlet means to the compression chamber and expansion chamber are provided in the housing.

10. A power plant according to claim 8 wherein the vane means includes vanes that are slidably disposed in the housing;
   means in the housing urge the vanes inward against the central member;
   the central member rotates relative to the housing and is connected to the power output shaft; and
   the inlet and outlet means to the compression chamber and the expansion chamber are provided in the central member.

11. A power plant according to claim 8 wherein the vane means includes vanes that are slidably disposed in the housing means in the housing urge the vanes inward against the central member;

the housing rotates relative to the central member and is connected to the power output shaft; and the inlet and outlet means to the compression chamber and the expansion chamber are provided in the central member.

12. A power plant according to claim 8 wherein the vane means includes vanes that are slidably disposed in the housing;

means in the housing urges the vanes inward against the central member;

the central member rotates relative to the housing and is connected to the power output shaft; and the inlet and outlet means to the compression chamber and expansion chamber are provided in the housing.

13. A power plant according to claim 12 wherein the vanes are slidably disposed in corresponding vane chambers in said housing;

the vane chambers include inlet and outlet means to the compression chamber and the expansion chamber; and the vanes include valve portions cooperating with the inlet and outlet means of the engine to provide compression chamber inlet, compression chamber outlet, expansion chamber inlet and expansion chamber exhaust functions.

14. A power plant according to claim 13 wherein there are two vane chambers, the first vane chamber includes a compression chamber inlet and an expansion chamber outlet on opposite sides of the first vane;

the second vane chamber includes a compression outlet and an expansion chamber inlet on opposite sides of the second vane.

15. A power plant according to claim 14 wherein the vane in the second vane chamber includes valve means for timing the introduction of gases into the engine expansion chamber.

16. A power plant according to claim 10 wherein the central member has heat exchanger means including a plurality of passages formed therein in a circuitous path for conveying the air and combusted gas in opposite directions in adjacent paths having a common wall.

* * * * *